E. M. LANG.
HACK SAW.
APPLICATION FILED SEPT. 15, 1919. RENEWED MAR. 30, 1922.

1,434,295. Patented Oct. 31, 1922.

Inventor:
Edward M. Lang
by S. W. Bates
Atty.

Patented Oct. 31, 1922.

1,434,295

UNITED STATES PATENT OFFICE.

EDWARD M. LANG, OF PORTLAND, MAINE.

HACK SAW.

Application filed September 15, 1919. Serial No. 323,922. Renewed March 30, 1922. Serial No. 548,189.

*To all whom it may concern:*

Be it known that I, EDWARD M. LANG, a citizen of the United States, residing at Portland, in the county of Cumberland and State of Maine, have invented certain new and useful Improvements in Hack Saws, of which the following is a specification.

My invention relates to saw blades for sawing metal commonly known as hack saws.

Under old conditions, when steel was comparatively cheap, hack saws were made with a line of teeth on one edge only and when the teeth were worn out the saw was thrown away or discarded.

These saws are necessarily hardened throughout so as to give the teeth the utmost wearing quality, but as a result of this hardening process the saws become brittle and are easily broken.

The object of my invention is to prolong the life of the saw and also to make it stronger and less liable to breakage.

I accomplish this object by forming the teeth on both edges of the hack saw blade and by concaving the same in cross section so that the two edges of the blade will be thicker than the center.

The teeth are preferably formed without set, or they may be set in the usual manner.

These hack saw blades are usually broken by becoming bound or cramped in the saw scarf. It is desirable, therefore, that the body of the saw in rear of the teeth shall have as much clearance as possible so that it will be less liable to bind or cramp in the saw scarf than when the blade is perfectly uniform in thickness as under the old practice.

Again, the removal of metal from the central line of the blade, making the blade thinnest at that point and the addition of this metal along the edges of the saw, renders it strong when subjected to bending moment and twist as the thickened edge has a tendency to resist these strains.

The central or neutral line of the blade is subjected to far less strain than the edges so that the metal can be spared from that point and disposed along the edges with the advantage of making a much stronger blade.

By making the concavity of the blade in cross section sufficiently pronounced, the cutting edges of the teeth may be made without any set, but if a set or lateral bend is applied to the teeth the clearance is much more pronounced than in a saw constructed in the old manner.

In practical use, a hack saw is most liable to become cramped and broken in the early part of the cut before the scarf has become sufficiently deep to form a guide for the saw.

By forming the saw according to my invention, the sides of the blade recede rapidly from the edges of the teeth and the blade is less liable than in the old form to cramp against the edges of the saw scarf.

In constructing a hack saw blade in accordance with my invention, I am able to make the two lines of teeth of different pitch thus adapting the saw to several kinds of work. I practically double the wearing life of the blade by doubling the number of teeth and construct a blade of far greater strength than if the same was formed in the old manner.

The invention is particularly valuable in the case of power hack saws which are of considerable width and in which the breaking strains are often very great.

The teeth of the saw if without set are stronger and heavier than when made with a set, being less liable to break since the metal has not been laterally bent or set.

I have illustrated my invention in the accompanying drawing in which.

Figure 1:
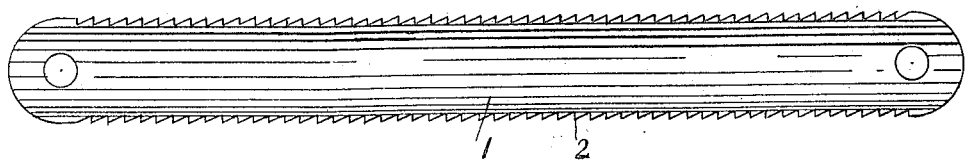
Fig. 1 is a side elevation of the saw blade.
Figure 2:
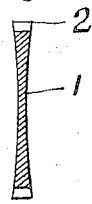
Fig. 2 is an enlarged cross section.

Referring to the drawing, 1 represents the body of the blade and 2 the teeth, a line of which is formed on each edge of the blade.

The blade is concaved in cross section from edge to edge, the concavity extending preferably to the outer edges of the teeth so that the outer edges of the teeth are slightly wider than their bases. The teeth, as here shown, are not set or bent laterally so that they are not weakened in the act of setting.

The outer edges of the teeth being slightly wider than the body of the saw back of the base, a saw scarf will be produced wider than the body of the saw and so will prevent the binding and cramping of the saw.

The hack saw blade thus produced is strong and contains double the wearing surface of the ordinary hack saw blade. It can be made as cheaply as the ordinary hack saw by having the steel specially rolled with a concave cross section and thickened edge.

I claim:

A hack saw blade having teeth on both edges and having a concave cross section.

In testimony whereof I have affixed my signature.

EDWARD M. LANG.